Feb. 26, 1957 E. J. RIVOCHE 2,783,154
PROCESS FOR PREPARING FOOD PRODUCTS
Filed Jan. 6, 1953
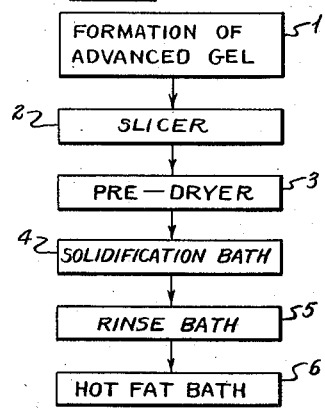
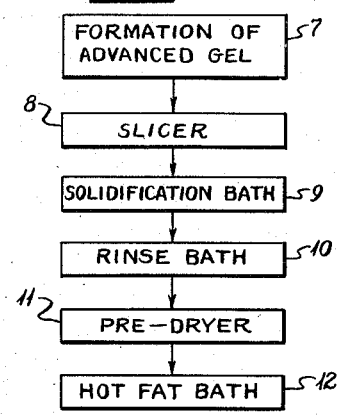
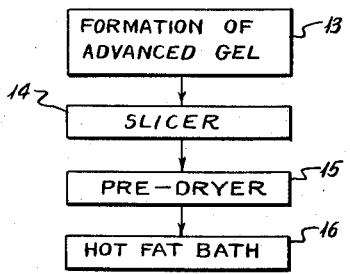
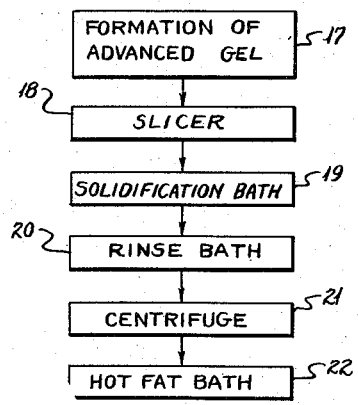
INVENTOR
EUGENE JOEL RIVOCHE
BY *Bacon & Thomas*
ATTORNEYS

United States Patent Office 2,783,154
Patented Feb. 26, 1957

2,783,154

PROCESS FOR PREPARING FOOD PRODUCTS

Eugene Joel Rivoche, Washington, D. C.

Application January 6, 1953, Serial No. 329,796

5 Claims. (Cl. 99—131)

This invention relates to a novel process for making food products which are cooked in a hot liquid medium through the use of a passenger gel stage. More particularly, the invention relates to an improvement in the process set out in my copending application, Serial No. 307,217, filed August 30, 1952, and involves the formation of a water colloid solution into which homogeneously intermixed food particles and a gelation agent are uniformly distributed to form an advanced gel structure which fixes the food particles in a support which closely approximates the desired natural food structure.

In that application, there was disclosed a new process which was adapted to the production of wafers or chips wherein as a passenger gel stage a thixotropic semi-gel-like substance is formed by dispersing a more or less comminuted, powdered, granulated or shredded foodstuff in a water solution of an edible hydrophylic colloid in which the dispersed foodstuff is present as discrete particles substantially unhydrated and more or less completely enclosed in a matrix of colloid gel. After the thixotropic semi-gel containing the foodstuff has been prepared and shaped, it is then further processed by one of several alternative methods to bring about a conversion from the thixotropic semi-gel-like substance to a firm advanced gel structure or coagulum strong enough and of such a character to withstand a slicing step and a frying or cooking step in a hot liquid medium such as fat or oil. One method of securing the conversion from semi-gel to advanced gel involves the incorporation of a potential gellation agent in an inert form in the semi-gel-like substance at the time of its original preparation so that such gellation agent may become active to bring about the final gelatinization at a subsequent time when such gellation agent is activated by a subsequent step. This can be accomplished by incorporating an insoluble salt of an edible alkaline earth metal, preferably an insoluble calcium salt, into the original mixture and subsequently contacting this insoluble salt with a uniformly dispersed edible acid which causes the salt to dissolve, thereby instituting the final gelatinization. Another method of bringing about the conversion to the coagulum state involves the use of a soluble salt of an edible alkaline earth metal, again preferably a calcium salt. In this particular manner of bringing about the final coagulation, the speed of formation may be controlled through the selection of the particular calcium salt, different salts dissolving more quickly than others, through the use of temperature control, or through the use of passenger buffers which delay the coagulum formation through a temporary rise in pH. In each of these methods transformation of the semi-gel into an advanced gel is accomplished by the action of alkaline earth metal ions upon the hydrophilic colloid.

Where the food product being manufactured is a chip or cookie, the semi-gel-like substance is fed into a feed pipe while still in the semi-gel stage, and this is converted into an advanced gel during passage through the pipe. The advanced gel or coagulum issuing from the pipe is then sliced and either fed to a solidification bath, rinse bath, and deep fat fryer, or is fed directly from the slicing step to the hot liquid bath. In the hot liquid bath, the water contained in the slices, normally seventy to eighty percent by weight of the slice, is rapidly evaporated, and the frying slice absorbs a quantity of fat from the bath that is dependent upon the structure or porosity of the chip and upon the time that it remains in the bath. An average potato chip will normally emerge from the bath with a fat content of about forty percent by weight.

I have discovered that if the quantity of fat or oil absorbed from the bath is controlled and if the fat or oil absorption is held to a low predetermined amount, several substantial advantages result. I have further discovered that if the water content of the fully advanced gel slices is controlled, the fat or oil absorption can be controlled as a function of such water content. Since the advanced gel or coagulum undergoes syneresis for a period of forty-eight to seventy-two hours after formation, it is very easy to remove a large percentage of the water held in the slices. Because of the nature of the coagulum and the shape of the thin slices, the slice retains its outward structural shape and does not measurably change in dimension. The elimination of water, however, results in the concentration of the colloid, that is, the algin, pectin, agar-agar, etc., and a very substantial percentage-wise increase of dry substance in the slice which causes the gelt structure to further solidify and become tougher. The elimination of water also results in the gel structure filling or eliminating to a large extent the voids within which the water resided. When such dried slices are cooked in the hot liquid bath, they fry faster than undried slices because there is less water to be evaporated. Because of this decrease in the amount of water which must be evaporated, there is a smaller flash action which reduces the attrition of the bath due to splattering. The reduced porosity of the slices and the higher concentration of dry constituents permits a smaller amount of fat to enter the chip so that its final fat content is lower than it would have been had not the water been removed. This reduction in fat content is supplemented by the decrease in frying time which allows less time for fat impregnation of the chip. Because the slices are less porous and because they fry faster, it is possible to use a fat or oil bath having a lower temperature than is customary and this lower bath temperature increases the shelf life of the chip because the fat or oil has not been overheated and thus does not oxidize or become rancid as fast as ordinary fat from baths which are heated to a temperature close to the flash temperature of the fat. The lower fat temperature and the reduced cooking time further affords a convenient means of chip color control. It has also been found that pre-drying the coagulum slices completely eliminates any tendency for the slices to stick together.

While pre-drying through evaporation of free water is probably the simplest means of reducing the water content of the coagulum slices, it is also possible to remove such water by other means such as a centrifuge operation.

In addition to being able to control the fat or grease content of the finished food product through the control of the moisture content of the coagulum, I have also discovered that a more limited control of such fat or grease content may be obtained through a variation in the amount of carbohydrates or food matter in the coagulum. Thus, by increasing the amount of food powder which is used in forming the semi-gel-like substance, a coagulum is later formed which contains a higher percentage of food particles and a correspondingly lower percentage of water which may be replaced with fat in the frying step. This method, however, is subject to rather strict limitations since it is impossible to increase the food powder content substantially above approximately thirty to fifty percent of the total weight of the semi-gel because with food powders in excess of this amount it becomes impossible to properly mix the semi-gel-like substances and obtain the desired distribution of its constituents. One of the fundamental points of novelty in this process lies in the fact that the carbohydrates or food powder utilized is contained in the final coagulum in a substantially unhydrated form, the flour molecules or particles being distributed in the colloid or gel framework. In order to achieve this end, or to form a gel framework at all, it is necessary to prevent any appreciable amount of hydration of the food powder in the original mixing with water. Several methods of accomplishing this step have been disclosed in my aforementioned application and it need only be pointed out here that it is impossible to disperse an amount of food powder exceeding approximately thirty to fifty percent of the weight of the semi-gel because of the hydration of the food powder which occurs on mixing. In such an event, there is no formation of a gel structure because the food flour hydrates and rapidly absorbs all of the water to form a creamy mash, leaving no water within which the colloid may dissolve.

It is an object of this invention to provide a process through which an accurate control of the fat content of fried food products might be obtained.

It is another object of this invention to provide a process for accurately controlling the ultimate fat content of food products which are cooked in a hot liquid bath.

It is a further object of this invention to provide for the accurate control of the fat content of food products made through a process utilizing a passenger gel stage to obtain a food structure.

It is a further object of this invention to accurately control the fat content of food products made through a process utilizing a passenger gel stage to obtain a food structure wherein the passenger gel is predried prior to the cooking step.

Further objects and advantages of this invention will become apparent upon reference to the following specification and drawings, in which:

Figure 1 shows a flow diagram of one embodiment of the invention,

Figure 2 shows a flow diagram of a second embodiment of the invention,

Figure 3 shows a flow diagram of a third embodiment of the invention, and

Figure 4 shows a flow diagram of a fourth embodiment of the invention.

Referring to Figure 1, there is formed at 1, according to any of the processes disclosed in my aforementioned application, an advanced gel which is forced through any suitable feed means to a slicer 2 which forms slices of the advanced gel which may vary in thickness between the very thin slices desired in the production of chips and the much thicker slices desired in the production of cookies. Following the slicing step, the individual slices are fed by any suitable means, such as a conveyor belt, to a pre-dryer 3 which may be of any suitable type, such as an air dryer, a band dryer, tunnel dryer, etc. It has been found that if the slices are dried by means of air having a relatively low temperature, that is, between around 120 and 150° F., or lower if sufficient air volume is available, it is easy to remove approximately fifty percent by weight of the water within a very short period of time. Following the predrying step, the partially dried slices are fed to a solidification bath 4 which contains any suitable jellification agent, such as a solution of an edible soluble salt of an alkaline earth metal, preferably a calcium salt. Such bath performs the function of insuring that all parts of the slices are completely in an advanced gel state. Upon emergence from the solidification bath 4, the slices are then fed to a rinse bath 5 which washes away any traces of the solidification agent from the solidification bath and prepares the slices for introduction into the hot fat bath 6 wherein they are fried or otherwise cooked.

While primary reference has been made herein to chips, it is to be understood that this process also relates to to cookies, saltines, crackers, or other similar products, it becoming possible to manufacture all such products in a hot fat or oil bath because of the ability to limit the fat absorption. This is extremely important in the baking industry where the ability to cook cookies in a fat bath will eliminate the necessity for the use of highly expensive band ovens.

In addition to being suitable for the preparation of starchy food products, the new process is also capable of use with the meat and fish products mentioned in my copending application.

In Figure 2, there is shown a second embodiment of my invention wherein an advanced gel is formed at 7 and is fed through any suitable feed means to a slicer 8 where slices of the desired thickness are formed. The slices issuing from the slicing machine 8 are next fed to a solidification bath 9 and thence to a rinse bath 10. The advanced gel slices emerging from the rinse bath 10 are dried by means of any suitable predryer 11, of any of the types heretofore mentioned. The partially dried slices are then dropped into the hot fat bath 12 for the final cooking step.

In Figure 3, there is shown still a further embodiment of the invention wherein an advanced gel formed at 13 is fed to a slicer 14 and thence directly to a predryer 15 with the partially dried advanced gel slices being directly fed from the predryer 15 to a hot fat bath 16.

In certain cases it might be found desirable to add an additional step to the process wherein the predried slices are submerged in water for a very short period of time prior to being dropped into the fat bath as an added precaution against sticking of slices in the fat bath. The submersion step is limited to such a short period as to preclude any reabsorption of water.

In Figure 4 there is shown still another embodiment of the invention wherein an advanced gel formed at 17 is fed to a slicer 18, solidification bath 19 and rinse bath 20. Upon emerging from the rinse bath the slices are conveyed by any conventional means to a centrifuge 21 wherein the desired amount of free water is removed. After removal from the centrifuge the slices are fed directly to a hot fat bath 22 wherein the food product is cooked.

While the foregoing embodiments of my invention have involved passenger gel processes wherein the finished food product obtained its fat content from the cooking bath, it is also possible to utilize the invention with a passenger gel food process wherein the fat content of the finished product is mixed into the original semi-gel-like substance as is described in my aforementioned copending application. In such process, the oil is introduced into the gel structure prior to the formation of the advanced gel and is present in the advanced gel structure. After the predrying step, the porosity and water content of the slices have been reduced sufficiently so that substantially no fat or oil is absorbed during the drying step, all of the fat content of the finished food product being obtained from the original intermixture of fat. The advantages of this particular embodiment of the invention are many and are fully set out in my copending application. Since substantially no fat absorption occurs the necessity for maintaining a clean, high quality fat cooking bath is eliminated and almost any nontoxic liquid cooking medium becomes satisfactory. Thus since the bath liquid will form no part of the food product and since the bath temperature need not be nearly as high as heretofore considered necessary, it is possible to use, as an example, a mineral oil for the cooking bath, as well as various types of vegetable oils, bearing in mind that the flash point of the cooking medium must be higher than the boiling point of water. In addition to the foregoing mediums, it is also possible to cook the food products in various types of gaseous mediums such as hot air, superheated steam, or even under infra red lights or by high frequency dielectric heating.

Whereas this invention has been described in connection with specific examples, such examples have been used by way of illustration only and are not to be deemed limiting in any sense, the invention being limited only by the scope and spirit of the appended claims.

I claim:

1. In a process for preparing cooked food products wherein food particles are homogeneously dispersed in a water-colloid solution, said water-colloid solution is subjected to the action of free alkaline earth metal ions to cause said solution to form a heat-irreversible advanced gel while said food particles are maintained in their homogeneously-dispersed condition, and said advanced gel is cooked in a bath of hot oil to provide a crispy product having a firm rigid structure and exhibiting substantially no gel characteristics, the improvement comprising: removing a substantial amount of moisture from said advanced gel prior to introducing said gel into said bath of hot oil so that the reduced porosity of the gel and the higher concentration of solid constituents limits the amount of oil absorbed from the hot oil bath during the cooking operation.

2. The process of claim 1, wherein said moisture is removed from the advanced gel by evaporation.

3. The process of claim 1, wherein said moisture is removed by contacting said advanced gel with a heated gaseous atmosphere.

4. The process of claim 1, wherein said moisture is removed from the advanced gel by centrifugal action.

5. The process of claim 1, wherein said advanced gel is cut into slices prior to the removal of moisture therefrom.

References Cited in the file of this patent

UNITED STATES PATENTS

| | | |
|---|---|---|
| 1,795,980 | Wahl | Mar. 10, 1931 |
| 2,036,922 | Clark et al. | Apr. 7, 1936 |
| 2,168,246 | Sheperd | Aug. 1, 1939 |
| 2,233,574 | Baker et al. | Mar. 4, 1941 |
| 2,334,281 | Olsen et al. | Nov. 16, 1943 |
| 2,373,729 | Willaman | Apr. 17, 1945 |
| 2,403,547 | Peschardt | July 9, 1946 |
| 2,441,729 | Steiner | May 18, 1948 |